United States Patent [19]

Young

[11] 4,386,118
[45] May 31, 1983

[54] PLASTIC BEARING MATERIALS

[76] Inventor: David S. Young, 11, Meadow View, Marlow, Buckinghamshire, England

[21] Appl. No.: 704,800

[22] Filed: Jul. 13, 1976

[30] Foreign Application Priority Data

Jul. 16, 1975 [GB] United Kingdom ............... 29800/75

[51] Int. Cl.³ .......................... B05D 3/02; B05D 3/12
[52] U.S. Cl. ..................................... 427/178; 427/195;
427/374.3; 427/374.4; 427/374.5; 427/388.1;
427/398.3
[58] Field of Search ................. 427/32, 195, 178, 179,
427/379, 374 B, 374 C, 374 D, 374.3, 374.4,
374.5, 388.1, 398.3, 19

[56] References Cited

U.S. PATENT DOCUMENTS

| | | |
|---|---|---|
| 374,112 | 11/1887 | Caldwell ............................ 427/178 |
| 3,579,379 | 5/1971 | Van Berkel et al. ....... 427/374 B X |
| 3,647,500 | 3/1972 | Mizuno ............................ 427/195 X |
| 3,657,042 | 4/1972 | Rerolle et al. ................... 156/191 X |
| 3,801,379 | 4/1974 | Blackwell ........................ 427/195 X |
| 3,968,280 | 7/1976 | Poppe et al. ........................ 427/195 |

OTHER PUBLICATIONS

Polyolefins: Structure and Properties; H. V. Boeing Elsevier Publishing Company; 1966, pp. 112–117 and 136–139.

Primary Examiner—Michael R. Lusignan
Assistant Examiner—Janyce A. Bell
Attorney, Agent, or Firm—Oblon, Fisher, Spivak, McClelland & Maier

[57] ABSTRACT

This invention is a method of making an elongate strip of bearing material in which a strong backing has a lining of polyphenylene sulphide applied to it. The lining is heated to be melted and bonded to the backing and partly cured, and it is then rapidly reduced in temperature and that gives it sufficient ductility to be coiled for further heat treatment or for storage without cracking the lining.

15 Claims, 5 Drawing Figures

PLASTIC BEARING MATERIALS

BACKGROUND OF THE INVENTION

1. Field of the Invention

The present invention relates to a mechanical process and apparatus for bonding polymeric materials, such as a polyarylene sulphide, in particular polyphenylene sulphide, to a long length of backing and curing and cross linking polyphenylene sulphide on the backing to form an elongate strip of bearing material.

2. Description of the Prior Art

One problem encountered in cladding a continuous backing with a polymeric coating, wherein the polymeric coating must be heat cured, is that the length of the processing equipment can become unacceptably lengthy. The usual speed of a continuously moving strip, which is to be coated and cured with a polymeric material, is about 10 meters per minute. If the curing operation requires 1 hour of heating time, that means that the heating apparatus must be 600 meters long. Obviously, the answer which comes to mind is to reduce the speed of the continuously moving strip so that shorter apparatus can be used. Even so, however, if the speed is reduced by a factor of 10 to say 1 meter/minute, the heating apparatus required must still be of a length of 60 meters.

SUMMARY OF THE INVENTION

According to the present invention, an elongate strip of bearing material is obtained by applying a lining of polyarylene sulphide to one surface of a backing strip. The sulphide is heated to melt and thereafter the temperature of the combination is rapidly reduced.

In a preferred method, the lining of polyarylene sulphide is spread onto the metal backing as a powder and is melted onto the backing to form an adherent, substantially non-porous layer. The lining and backing are then rapidly cooled, within a few seconds, from above the melting temperature of the polymer to substantially room temperature. A suitable method of rapid cooling is by use of a cold water quench, which is particularly advantageous in that quenching prevents brittleness due to crystallization which otherwise occurs on slow cooling. The quenched material is therefore quite ductile. It can thus be coiled, and further heat treated to complete the cure of the lining. The space saving advantages of this technique are considerable.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figures 1, 2:
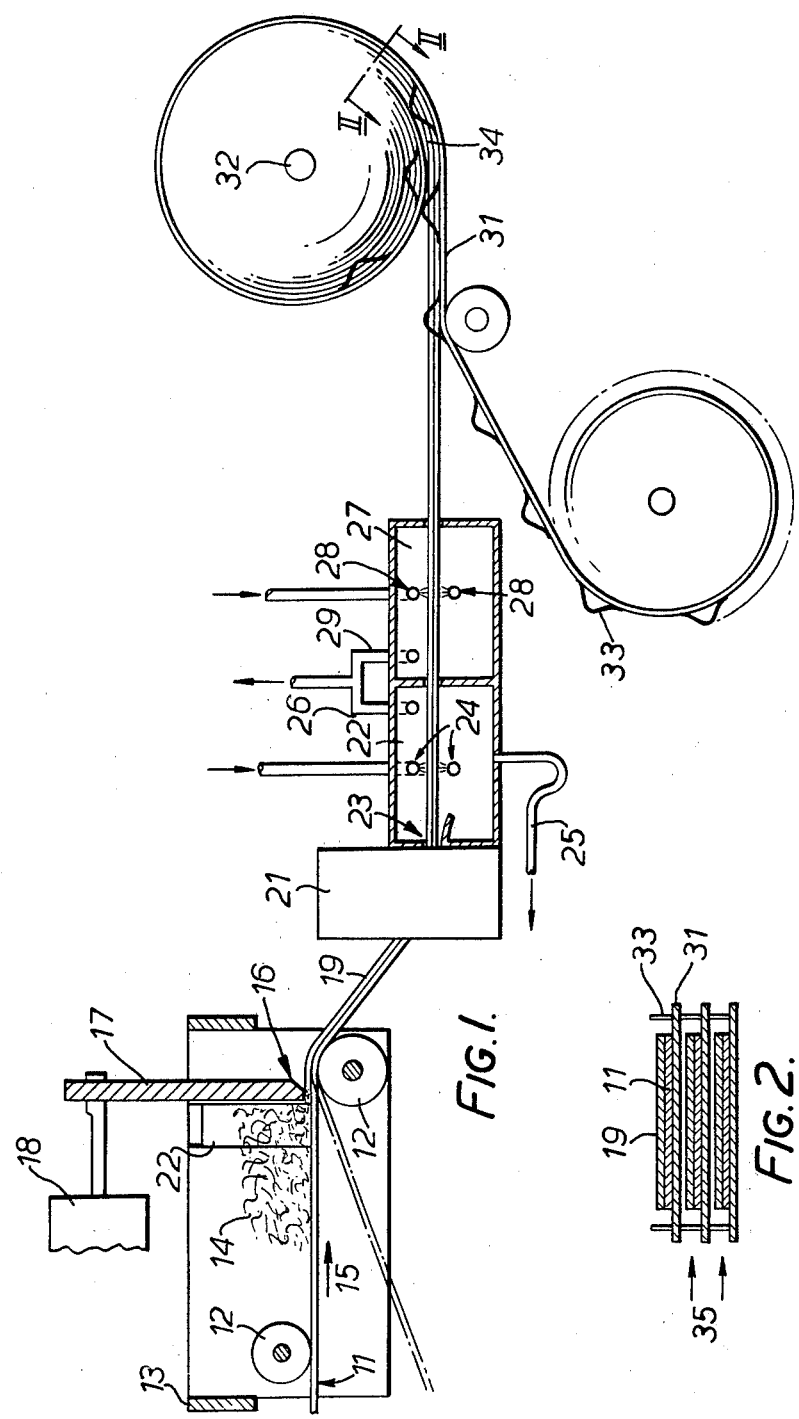
FIG. 1 is a diagrammatic side view of apparatus in use making an elongate strip of bearing material.
FIG. 2 is a section on the line II—II in FIG. 1.

In coiling the partially cured PPS-backing, the turns of the coil are separated by use of appropriate spacers which permit the passage of air through the coil and which prevents adjacent layers of polyarylene sulphide from mutually adhering during the subsequent cure.

The polyarylene sulphide used in this invention is preferably a pre-treated powder which may contain cure promoters.

The backing may be of steel, aluminum or aluminum alloy. If the backing is steel, it may be copper plated and then have a sintered bronze coating applied to the copper, so that the polyarylene sulphide is applied to the bronze.

A continuous elongate strip of aluminum alloy 11, 0.064 inches thick is guided by rollers 12 through a distribution box 13. The box contains uncured polyphenylene sulphide powder 14 and as the strip moves in the direction of the arrow 15 through the box it takes with it some of the PPS powder and leads it through a horizontal slot indicated generally at 16 at the outlet from the box, the top of the slot being defined by a vertically reciprocating compacting member 17 driven by a motor 18. The effect of the compacting member 17 is to compact the powder on the strip 11 so that the powder passes with the strip as a lining 19 to an induction heater 21. The rollers 12 prevent the strip 11 from becoming concave or convex when seen in end view, and a pair of feet 22 on either side of the box just upstream of the slot 16 locate the edges of the strip.

In the induction heater 21 the temperature is raised to between 290° C. and 310° C. in order to melt the PPS and enable it to become a continuous coherent lining on the strip 11. It is also possible by heating the strip and PPS for perhaps 10 minutes at a temperature between 330° C. and 350° C. to partly cure the PPS.

Immediately after leaving the heater 21, the strip and lining are rapidly cooled to ambient temperature in a water bath 22 having an entry slot 23 adjacent the heater and having transverse jet pipes 24 above and below the path of the composite strip and having also an exit 25 for water to be recycled and an exit 26 for water vapor.

The cooling arrangements are such that the temperature can be reduced to ambient temperature in less than 5 seconds and preferably in about 2 seconds. Thereafter, the strip can remain in the bath at that temperature independent upon the speed with which it has been driven through the heater 21.

From the bath 22, the cooled strip passes through a drying chamber 27, having transverse ducts 28 above and below the strip path, for directing drying air onto both sides of the composite strip, and also having an exhaust 29 for the air.

Figure 3:
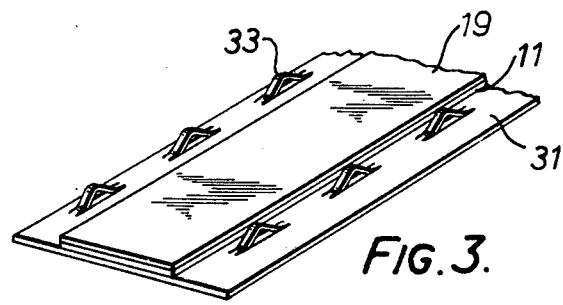
FIG. 3 is a perspective view of a part of FIGS. 1 and 2.

The effect of the heating in the heater 21, and the rapid cooling in the bath 22 is to provide a very ductile composite strip which can be coiled into coils of diameters as little as 6 inches, without cracking the lining. Accordingly, the strip leaving the drying chamber 27 is fed onto a continuous carrier belt 31 and coiled around a shaft 32. The carrier belt is, as indicated in FIG. 3, wider than the composite strip 11, 19 with the exposed edges containing upwardly standing spacers 33. FIGS. 1 and 2 show how the spacers act against the back of the belt 31 of an inner turn of the coil to maintain a space indicated at 34 between the exposed face of the lining 19 and the opposed back of the belt 31 of an inner turn.

Thus in the completed coil, the partly cured PPS can be completely cured by heating in air for 2 hours at a temperature between 370° and 380° C. The air can flow or can be directed as indicated by the arrows 35 in FIG. 2 so as to pass over all exposed surfaces of the lining 19. This enables complete cure to be achieved in 2 hours, even with the lining thickness described of 0.064 inches. The coil of lined material is sufficiently compact for curing to take place while the coil is being wound or after a complete coil has been prepared and severed from the continuing strip, without requiring an unduly lengthy curing chamber. Thereafter the coil can be stored until it is used either in the wound condition with the belt 31 or after the belt 31 has been removed by uncoiling and recirculated for further use. Preferably the coil is stored in combination with the belt 31 and when it is necessary to use the coil, the belt is returned for forming further coils. The belt also prevents the lining 19 from becoming bonded to the back of the inner turn of the belt during curing. After curing has been completed, there is no further tendency for the lining to adhere to the backing, and accordingly, the lined backing could be simply recoiled without the belt 31.

Figure 4:
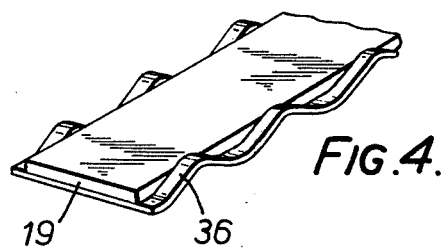
FIGS. 4 and 5 are perspective views of alternative arrangements to that shown in FIG. 3.

It is preferred not to rely on reusable belts 31 because the storage time is expected to be substantial and because uncoiling and recoiling is expensive. It is also possible for the strip 11 to be formed wider than the finally desired strip and to be formed with crimped edges as indicated at 36 in FIG. 4. The peaks of the crimped edges 36 will act in the same way to give an air space between successive turns of the coil for the purposes of curing, and thereafterwards the edges can be machined off without having to uncoil the coil.

Figure 5:
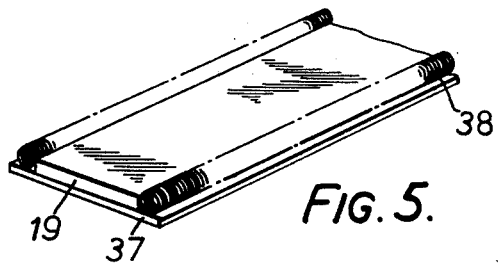

In an alternative arrangement the strip merely has flat edges 37 beyond the lining 19 and as the coil is wound, continuous spacers are fed between turns, possibly in the form of elongate springs, as shown at 38 in FIG. 5. These spacers can then be simply removed after curing has been completed. The turns of the spring 38 would, of course, be of a great enough pitch to allow the curing air to flow freely between the turns of the coil. It might, or might not, be necessary to machine off the unlined edges 37, depending on the particular form of bearing strip which is required.

Instead of coiling the strip as indicated with reference to FIG. 1, it is possible after the sudden cooling and drying to cut the strip into blanks and form moldings with bearings surfaces and then to cure the formed bearings by a similar heat treatment.

An optional feature is the passage of the cooled strip from 27 through a pair of sizing rolls to set the thickness of the lining.

After final curing, it is possible to indent the lining with pockets to receive a lubricant.

When a steel backing is used, the backing can be copper plated. A copper plated steel backing can be fed through the box 13 to receive a bronze powder which is sintered on the lined backing by passing it through the induction heater 21. It could be returned to the box 21 (or a similar box) for addition of the PPS and heating and quenching.

The final cure of PPS from its partially cured condition can occur acceptably at a temperature of 370° C. within one hour.

Although the principle mode of the present invention is to adherently bind the PPS to a backing, the bonding is not an essential aspect of the invention. For instance, it is possible by the present technique to use a reuseable metal belt from which the PPS can be removed after completion of the cure so as to provide a strong, unbacked, fully-cured bearing tape, which can alternatively be used for many of the purposes that polyarylene sulphide coatings are suited to, for example, insulation.

The belt may be treated with a release agent to assist removal of the tape.

It is possible that a bush or half-bearing could be finally cured and cross-linked after it has been formed.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for making an elongate strip of bearing material, which comprises:
    applying a layer of polyarylene sulfide to one surface of a backing;
    heating the sulfide to at least its melting point;
    partially curing said applied polyarylene sulfide;
    rapidly reducing the temperature of the melt in less than 5 seconds to ambient temperature prior to complete cure of said sulfide; and thereafter,
    curing said cooled sulfide.

2. The process of claim 1, in which the layer is at least 0.010 inches thick.

3. The purpose of claim 2 in which polyarylene sulfide is polyphenylene sulfide which is applied to the surface of the backing in the form of a powder.

4. The process of claim 1 in which the said rapid reduction in temperature is accomplished by cold water quenching.

5. The process of claim 1 in which the reduction in temperature is achieved in about 2 seconds.

6. The process of claim 1 in which the heating is at a temperature sufficient to melt the polyarylene sulfide but not sufficient to effect complete curing thereof.

7. The process of claim 1 in which after a rapid reduction in temperature the backing and lining are heated at a temperature of at least about 370° C. to cure the polyarylene sulfide.

8. The process of claim 7, in which the said heat treatment is performed for at least one hour.

9. The process of claim 1 in which after the rapid reduction in temperature, the strip and said layer are formed into a coil configuration, wherein adjacent turns of the said coil are mutually separated by means of spacers of sizes sufficient to allow passage of air therebetween.

10. The process of claim 9, wherein the backing and said layer are formed onto a reusable coil strip provided with spacers, and the coil strip, backing and said layer are coiled with the spacers sufficient to prevent mutual contact between adjacent turns of the coil.

11. The process of claim 9, in which the final curing of the polyarylene sulfide occur after coiling.

12. In a method for forming a coating of polyphenylene sulfide on the surface of a metal substrate which comprises fusing a powder of polyphenylene sulfide to the surface of metal substrate and then curing the resin under heat, the improvement which comprises quenching the fused polyphenylene sulfide resin to solidify it, and then heat-curing the resin.

13. The method of claim 12, wherein the polyphenylene sulfide resin fused at a temperature above its melting point is immediately quenched to ambient temperature in less than 5 seconds.

14. The method of claim 13, wherein the resin is quenched immediately.

15. The method of claim 12, wherein the quenching is carried out by dipping the metal substrate having the polyphenylene sulfide resin fused thereto in water held at a temperature of 100° C. or below.

* * * * *